US009535926B2

(12) United States Patent
Avati et al.

(10) Patent No.: US 9,535,926 B2
(45) Date of Patent: Jan. 3, 2017

(54) REDUCING TRANSACTION OPERATIONS USING DEFERRED OPERATIONS

(71) Applicant: Red Hat, Inc., Raleigh, NC (US)

(72) Inventors: Anand Vishweswaran Avati, Mountain View, CA (US); Pranith Kumar Karampuri, Jeedimetla (IN)

(73) Assignee: Red Hat, Inc., Raleigh, NC (US)

( * ) Notice: Subject to any disclaimer, the term of this patent is extended or adjusted under 35 U.S.C. 154(b) by 246 days.

(21) Appl. No.: 14/081,907

(22) Filed: Nov. 15, 2013

(65) Prior Publication Data
US 2015/0006592 A1 Jan. 1, 2015

Related U.S. Application Data

(60) Provisional application No. 61/839,738, filed on Jun. 26, 2013.

(51) Int. Cl.
*G06F 17/30* (2006.01)
(52) U.S. Cl.
CPC .............................. *G06F 17/30227* (2013.01)
(58) Field of Classification Search
None
See application file for complete search history.

(56) References Cited

U.S. PATENT DOCUMENTS

| | | | | |
|---|---|---|---|---|
| 5,870,757 A * | 2/1999 | Fuller | ................. | G06F 11/1471 |
| 6,205,491 B1 * | 3/2001 | Callsen | ................. | G06F 9/4428 712/244 |
| 6,530,079 B1 * | 3/2003 | Choi | ........................ | G06F 9/52 712/227 |
| 7,996,633 B2 * | 8/2011 | Zimmerer | ........... | G06F 11/1662 707/704 |
| 2002/0138483 A1 * | 9/2002 | Bretl | ................. | G06F 17/30351 |
| 2003/0187860 A1 * | 10/2003 | Holland | ............ | G06F 17/30171 |
| 2004/0250240 A1 * | 12/2004 | Stoodley | ............. | G06F 9/45516 717/116 |
| 2006/0242644 A1 * | 10/2006 | Blue | ....................... | G06F 9/526 718/100 |
| 2008/0288811 A1 * | 11/2008 | Sudhakar | .......... | G06F 17/30067 714/4.11 |
| 2009/0144281 A1 * | 6/2009 | Grcevski | ................. | G06F 9/528 |
| 2010/0325376 A1 * | 12/2010 | Ash | ..................... | G06F 11/1438 711/162 |
| 2011/0276549 A1 * | 11/2011 | Fathalla | ............ | G06F 17/30351 707/704 |

(Continued)

OTHER PUBLICATIONS

P. Diniz and M. Rinard, "Lock-Coarsening: Eliminating Lock Overhead in Automatically Parallelized Object-Based Programs," Proceedings of the 9th Workshop on Languages and Compilers for Parallel Computing, San Jose, Calif., Aug. 1996., pp. 285-299.*

*Primary Examiner* — Richard Bowen
(74) *Attorney, Agent, or Firm* — Lowenstein Sandler LLP (57) ABSTRACT

A server computer system performs a first set of operations for a first transaction. The first transaction pertaining to data stored in a file system. The server computer system delays a second set of operations for the first transaction and identifies a second transaction pertaining to the data. In response to identifying the second transaction, the server computer system cancels the second set of operations for the first transaction, and cancels a first set of operations for the second transaction.

20 Claims, 5 Drawing Sheets

(56) References Cited

U.S. PATENT DOCUMENTS

2013/0013833 A1\* 1/2013 Nagpal ................... G06F 13/14
710/200
2013/0086348 A1\* 4/2013 Marathe ................. G06F 9/467
711/163

\* cited by examiner

REDUCING TRANSACTION OPERATIONS USING DEFERRED OPERATIONS

RELATED APPLICATIONS

This patent application claims the benefit under 35 U.S.C. §119(e) of U.S. Provisional Application No. 61/839,738 filed Jun. 26, 2013, which is herein incorporated by reference.

TECHNICAL FIELD

The present disclosure relates to transactions, and more particularly, to reducing transaction operations using deferred operations.

BACKGROUND

Data may be stored as unstructured data, for example, in files and directories in a file system. A distributed file system may store multiple copies of a file and/or directory on more than one storage server machine to help ensure that, in case of a hardware failure and/or system failure, the data should still be accessible. Typically the protocol for replication in a distributed file system involves multiple operations for each transaction (e.g., write transaction). Generally, when there is a request for a transaction to write to a file, the protocol involves five operations (1) lock, (2) pre-operation change log, (3) operations (e.g., write), (4) post-operation change log, and (5) unlock. Some transactions may overlap in time, and may result in unwarranted and/or inefficient operations. For example, a file that is locked for Transaction-1 may be unlocked when Transaction-1 is completed and may be locked again for Transaction-2.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and system for reducing transaction operations using deferred operations, according to various implementations. Examples of a transaction can include, and are not limited to, writing to a file, modifying content of a file, deleting a file, creating a file, reading a file, etc. A cluster of storage servers may store copies of data to help prevent data loss. A cluster can be a set of linked storage servers working together closely. The protocol for replication in a distributed file system can involve multiple operations for each transaction (e.g., write transaction). For example, when there is a request for a transaction to write to a file, the protocol involves five operations (1) lock, (2) pre-operation change log, (3) operations (e.g., write), (4) post-operation change log, and (5) unlock. There may be some transactions which overlap in time. With traditional distributed files systems, the overlap may result in unwarranted and/or inefficient operations. For example, with conventional distributed file systems, a file that is locked for Transaction-1 may be unlocked when Transaction-1 is completed and may be locked again for Transaction-2.

Implementations of the present disclosure eliminate a subset of operations (e.g., post-operation change log, unlock, pre-operation change log, lock) for transactions that overlap in time. Implementations can remove operations to reduce the number of resources to process a transaction and, in some cases, reduce the amount of time to process a transaction (e.g., Transaction-2).

Figure 1:
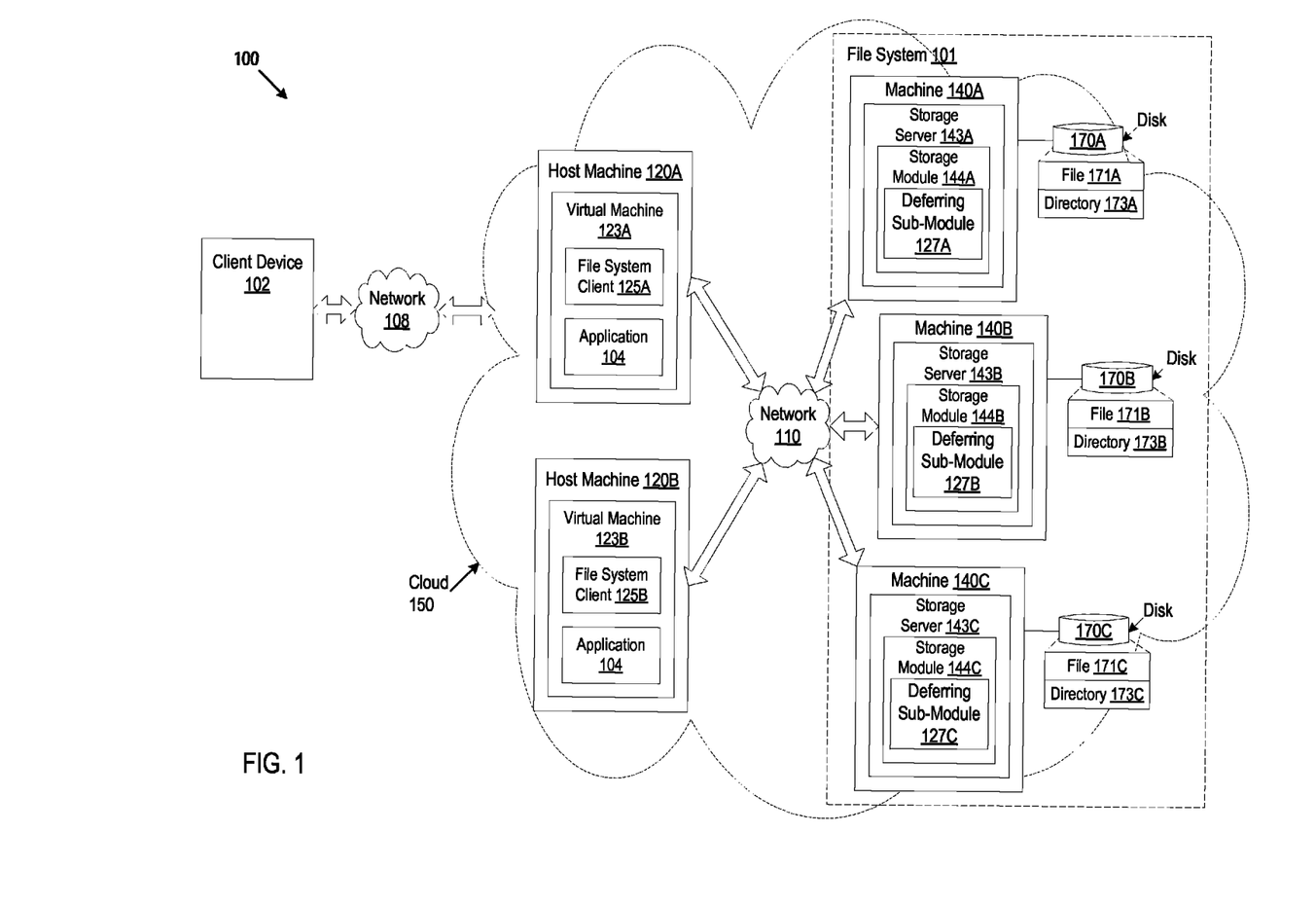
FIG. 1 illustrates an example system architecture, in accordance with various implementations.

FIG. 1 is an example system architecture 100 for various implementations. The system architecture 100 can include a distributed file system 101 coupled to one or more client devices 102 and host machines 120A-B via one or more networks 108,110. The networks 108,110 may be a public network, a private network, or a combination thereof. The distributed file system 101 can be a network attached storage file system that includes one or more machines 140A-C and one or more mass storage devices, such as magnetic or optical storage based disks 170A-C, solid-state drives (SSDs) or hard drives, coupled to the machines 140A-C via the network 110.

The system architecture 100 can include a cloud 150 which can provide virtual machines, such as virtual machines 123A-B. There can be one or more virtual machines 123A-B in the cloud 150. The virtual machines 123A-B can be hosted on a physical host machine 120A-B configured as part of the cloud 150. For example, virtual machines 123A-B may be respectively hosted on host machines 120A-B in cloud 150. One or more virtual machines can be hosted on a physical host machine. For example, host machine 120A may include two virtual machines. The host machines 120A-B can communicate to each other via the network 110. The host machines 120A-B can be located in a data center. The cloud 150 can be provided by a cloud provider. In one implementation, the distributed file system 101 is also part of the cloud 150. The distributed file system 101 can store data as files (e.g., files 171A-C) on storage devices (e.g., disks 170A-C) and can include directories (e.g., directories 173A-C), that are virtual containers within the file system 101, in which groups of computer files and possibly other directories can be kept and organized. Files that are related can be stored in the same directory.

A machine 140A-C can include a storage server 143A-C to manage access to the files 171A-C and directories 173A-C that are stored in the file system 101. The storage servers 143A-C can include a storage module 144A-C to handle access requests. One or more host machines 120A-B can include a file system client 125A-B to communicate with the storage servers 143A-C in the file system 101. Examples of file system clients 125A-B can include, and are not limited to, native file system clients and network file system (NFS) clients. "Native" can describe support for specific operating systems. For example, a native file system client may be, and is not limited to, a file system client that supports the Linux operating system.

Users can interact with applications 104 executing on the virtual machines 123A-B using client computer systems, such as client device 102. There can be one or more applications 104 in a virtual machine 123A-B. When there is not a virtualized environment, there can be one or more applications 104 executing in a host machine 120A-B. The client device 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. An application 104 can be any type of application including, for example, a web application, a desktop application, a database management application, a browser application, etc. Client devices 102 can be connected to host machines 120A-B via a network 108. An application 104 may request access (e.g., read, write, etc.) to the files 171A-C and/or directories 173A-C in the file system 101 via a file system client 125A-B.

Multiple copies of the data (e.g., file 171A-C, directories 173A-C) in the file system 101 can be stored on the disks 170A-C for redundancy to prevent data loss. For example, files 171A-C may be copies of the same file (e.g., files 171A-C can be copies of a virtual machine file of the virtual machine 123A or the virtual machine 123B), and directories 173A-C may be copies of the same directory. The storage servers 143A-C can be clustered in a replication domain to store the multiple copies of data (e.g., data files 171A-C, directories 173A-C) on various disks 170A-C to prevent data loss in case one of the storage servers 143A-C and/or machines 140A-C becomes unavailable, for example, due to a system failure or a hardware failure.

The storage servers 143A-C can manage the data (e.g., files 171A-C, directories 173A-C) being replicated in the cluster using a replication directory hierarchy, which is a directory structure that contains the files and directories being replicated amongst the clustered storage servers 143A-C. The storage servers 143A-C can propagate any changes that are made to the files and directories in their corresponding replication directory hierarchy to the other copies of the files and/or directories that are stored on the other disks and/or managed by other storage servers 143A-C. For example, disk 170A may store a file 171A. A copy of file 171A may be stored on disk 170B and disk 170C. When a change is made to file 171A, the storage server 143A can contact storage server 143B to make the same change to file 171B, and can contact storage server 143C to make the same change to file 171C. Examples of changes can include, and are not limited to, writing to a file, creation of a file, deletion of a file, rename of a file, update to the content of a file, etc.

Before a change is performed on a local copy of a file or directory or a remote copy of the file or directory, the storage servers that are making the change can perform a pre-operation change log operation to create or update a local change log of the file or the directory to reflect the change operations to be made. In one implementation, the change logs are tuples that contain elements representing copies of the file or directory. For example, there may be three copies of a file (e.g., file 171A, file 171B, file 171C) on three storage servers (e.g., storage server 143A, storage server 143B, storage server 143C). The change log for each copy of the file can be a tuple that contains three elements. Each element in the change log can be a count representing a pending change operation that is associated with the file or directory. For example, if there is a change to be made to file 171A, file 171B, and file 171C, the counts in the change log for each file may be incremented to (1,1,1), where the first element corresponds to the change being made to file 171A, the second element corresponds to the change being made to file 171B, and the third element corresponds to the change being made to file 171C. The change log can be stored as an extended attribute in the file or the directory. The change log can store values that represent counts of change operations for the copies of the file or directory. Implementations of updating the counts in the change logs are described in greater detail below in conjunction with FIG. 2 and FIG. 3.

When the change is made to file 171A and successfully replicated to file 171B and file 171C, the storage servers 143A-C can perform a post-operation change log operation to update the local change logs to reflect the successful change operations. For example, the storage servers 143A-C can decrement the change log values to (0,0,0) to represent that the change operations for file 171A, file 171B, and file 171C are successful and that there are no pending change operations related to any of the copies of the file.

The storage servers 143A-C can also create and/or update a change log for a directory (e.g., directory 173A-C), for example, when there is a change being made to a directory and copies of the directory. Examples of a change to a directory can include, and are not limited to, a file being created in a directory, a file being deleted in a directory, etc. A directory (e.g., directory 173A-C) can have a change log that includes counts representing change operations that are associated with changes made to directory 173A, directory 173B and directory 173C.

The storage servers 143A-C can include a deferring sub-module 127A-C to defer one or more operations (e.g., post-operation change log, unlock) for a transaction (e.g., write transaction) that is associated with a file and/or directory. In one implementation, the storage modules 114A-C include the deferring sub-modules 127A-C. The deferring sub-module 127A-C can also cancel one or more operations (e.g., post-operation change log, unlock, pre-operation change log, lock) for multiple transactions (e.g., write transactions) for the same file and/or the same directory. The cancellations can improve read/write efficiency because the marginal extra operation for each transaction is with write transactions.

Figure 2:
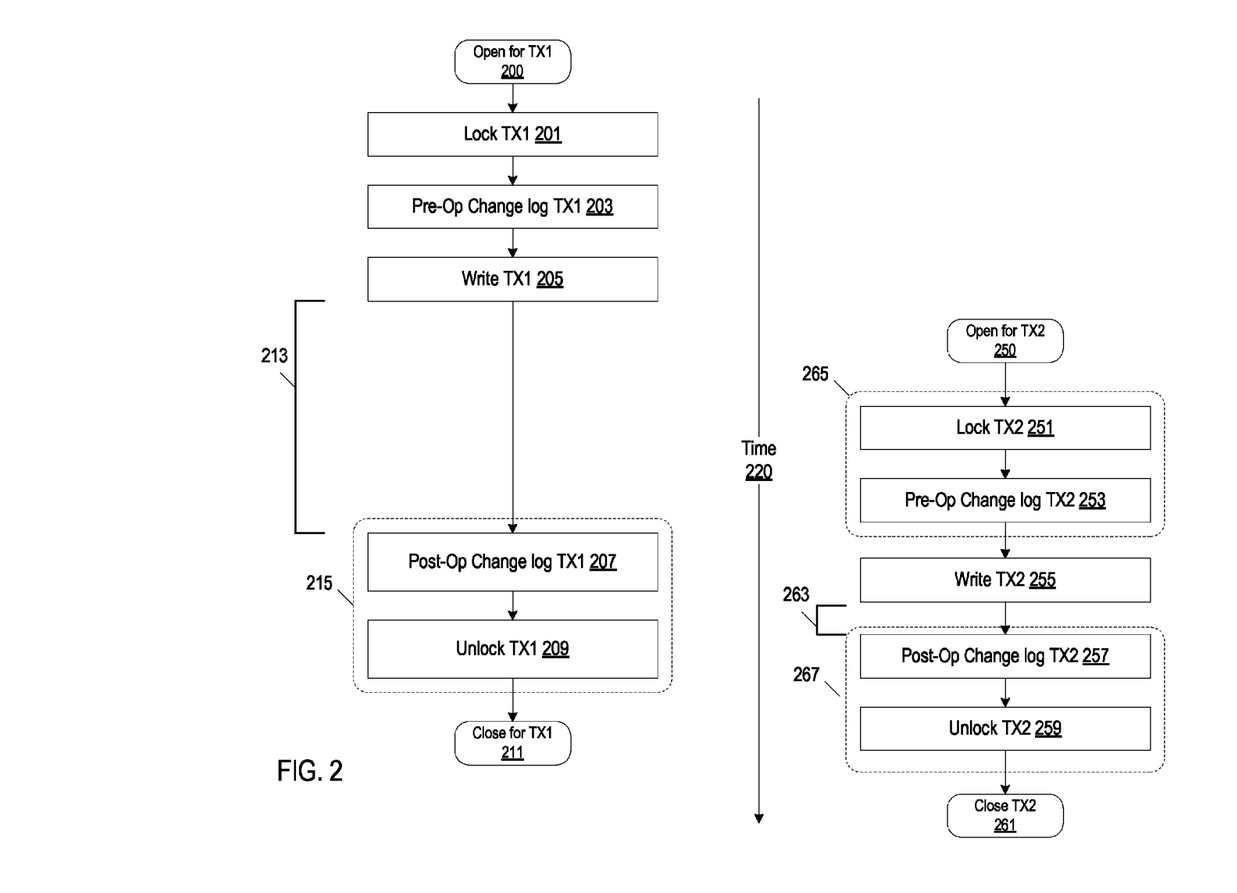
FIG. 2 is a block diagram of an implementation of deferring operations for first transaction and reducing operations for the first transaction and a second transaction.

FIG. 2 is a block diagram of an implementation of deferring operations for first transaction and reducing operations for the first transaction and a second transaction. There may be two write transactions, a first write transaction (TX1) and a second write transaction (TX2), to write to the same file, File-XYZ. The terms "first," "second," "third," "fourth," etc. as used herein are meant as labels to distinguish among different elements and may not necessarily have an ordinal meaning according to their numerical designation.

Generally, at the storage level, the storage subsystem uses a file descriptor for the file (e.g., File-XYZ) to perform an operation (e.g., open file operation). A file descriptor is an index for an entry in a kernel-resident data structure containing the details of the open files. In POSIX (portable operating system interface), the data structure may be called a file descriptor table. Typically, the file descriptors are assigned by the kernel, and the kernel records the assignment in the file descriptor table.

Storage servers (e.g., storage server 143A-C in FIG. 1) can include a replicate module and a deferring sub-module (e.g., deferring sub-module 127A-C in FIG. 1) to handle the transaction. There may be an open (200) operation for TX1 to open File-XYZ. The replicate module can receive a write request from a file system client to write data to File-XYZ that is stored in a data store that is coupled to the storage server. The write request is a request to change the data in File-XYZ. The replicate module can perform a lock operation (201) to lock at least a portion of File-XYZ for TX1. The replicate module can perform a pre-operation change log operation (203), for example, to increment the counts in a change log for File-XYZ to indicate the change being made to the local File-XYZ and being replicated to File-XYZ on other machines. The change log can be one of the extended attributes of the File-XYZ. The replicate module can increment the counts in the change log by performing an extended attribute operation. The replicate module can instruct a storage module (e.g., storage module 144A-C in FIG. 1) in the storage server to perform a write operation (205) to File-XYZ for TX1. The storage module can write to File-XYZ as requested.

File systems can perform buffer writing, where write transactions may be performed in the background. A storage server may receive a write request and may first acknowledge the application that the request is received and can be performed in the background. In the meantime, an application has opportunity to initiate another transaction (e.g., second write transaction), which may result in an overlap in time 220. For buffer writing, there may be times when the application may not submit the second write request soon enough. The deferring sub-module can create a delay (213) to defer a subset (215) of operations to increase the probability that a second transaction (e.g., TX2) for the same file, File-XYZ, can overlap in time 220 with the first transaction TX1, in buffer writing.

File systems can perform synchronous writes, where the file system does not communicate with an application until the data is actually written. Traditionally there are no overlapping transactions in synchronous writing. The deferring sub-module can create a delay (213) to defer a subset (215) of operations to increase the probability that a second transaction (e.g., TX2) for the same file, File-XYZ, can overlap in time 220 with the first transaction TX1, in synchronous writing.

One example of a file (e.g., File-XYZ) can include and is not limited to, a virtual machine file that is frequently updated during the execution of a respective virtual machine. The deferring sub-module can create a delay (213) to defer a subset (215) of operations. The delay (213) can increase the probability that a second transaction (e.g., TX2) for the same file, File-XYZ, can overlap in time 220 with the first transaction TX1. For example, the request to lock (251) X2 may be received before the unlock (209) for TX1 is performed. In another example, the request to perform pre-operation change log operation (253) for TX2 may be received before the post-operation change log (207) for TX1 is performed. In one implementation, the delay (213) is one second. The delay (213) can be configurable and user (e.g., system administrator) defined. The data specifying the delay can be stored as part of configuration data that is stored in a data store that is coupled to the deferring sub-module.

The deferring sub-module can detect the request for TX2 for the same file before the post-operation change log (207) operation for TX1 is performed and can cancel the subset (215) of operations for TX1. The subset (215) of operations can include one or more operations for the transaction. For example the subset (215) of operations can include the post-operation change log (207) operation for TX1 and the unlock (209) operation for TX1. For example, the request to lock TX2 (e.g., lock TX2 251 operation) may be received before the unlock for TX1 (e.g., unlock TX1 209 operation) is performed, and the deferring sub-module may cancel the unlock TX1 (209) operation and the lock TX2 (251) operation. In another example, the request to perform the pre-operation change log operation for TX2 (e.g., pre-operation change log TX2 253 operation) may be received before the post-operation change log TX1 (207) operation is performed, and the deferring sub-module can cancel the subset (215) of operations for TX1 (the post-operation change log TX1 (207) operation and the unlock TX1 (209) operation) and the subset (265) of operations for TX2 (the lock TX2 (251) operation and the pre-operation change log TX2 (253) operation).

A storage server can include a replicate module that can instruct a storage module to perform a write operation (251) to File-XYZ for TX2. The storage module can write to File-XYZ as requested. The deferring sub-module can create a delay (263) for TX2 to defer a subset (267) of operations to increase the probability that another transaction (e.g., TX3) for the same file, File-XYZ, may overlap in time 220 with the second transaction TX2.

In other implementations, the deferring sub-module creates the delay (213) after the post-operation change log TX1 (207) operation, and the subset (215) of operations includes the unlock TX1 (209) operation. In other implementations, the deferring sub-module creates more than one delay for a transaction. For example, the deferring sub-module may create a first delay (213) for TX1 to delay the post-operation change log (207) operation and may create a second delay to separately defer the unlock TX1 (209) operation.

In other implementations, the deferring sub-module cancels a subset (215) of operations that includes one operation (e.g., post-operation change log TX1 207 operation or unlock TX1 209 operation) for a first transaction. In other implementations, the deferring sub-module cancels a subset (265) of operations that includes one operation (e.g., lock TX2 251 operation or pre-operation change log TX2 253 operation) for a next transaction (e.g., TX2).

Figure 3:
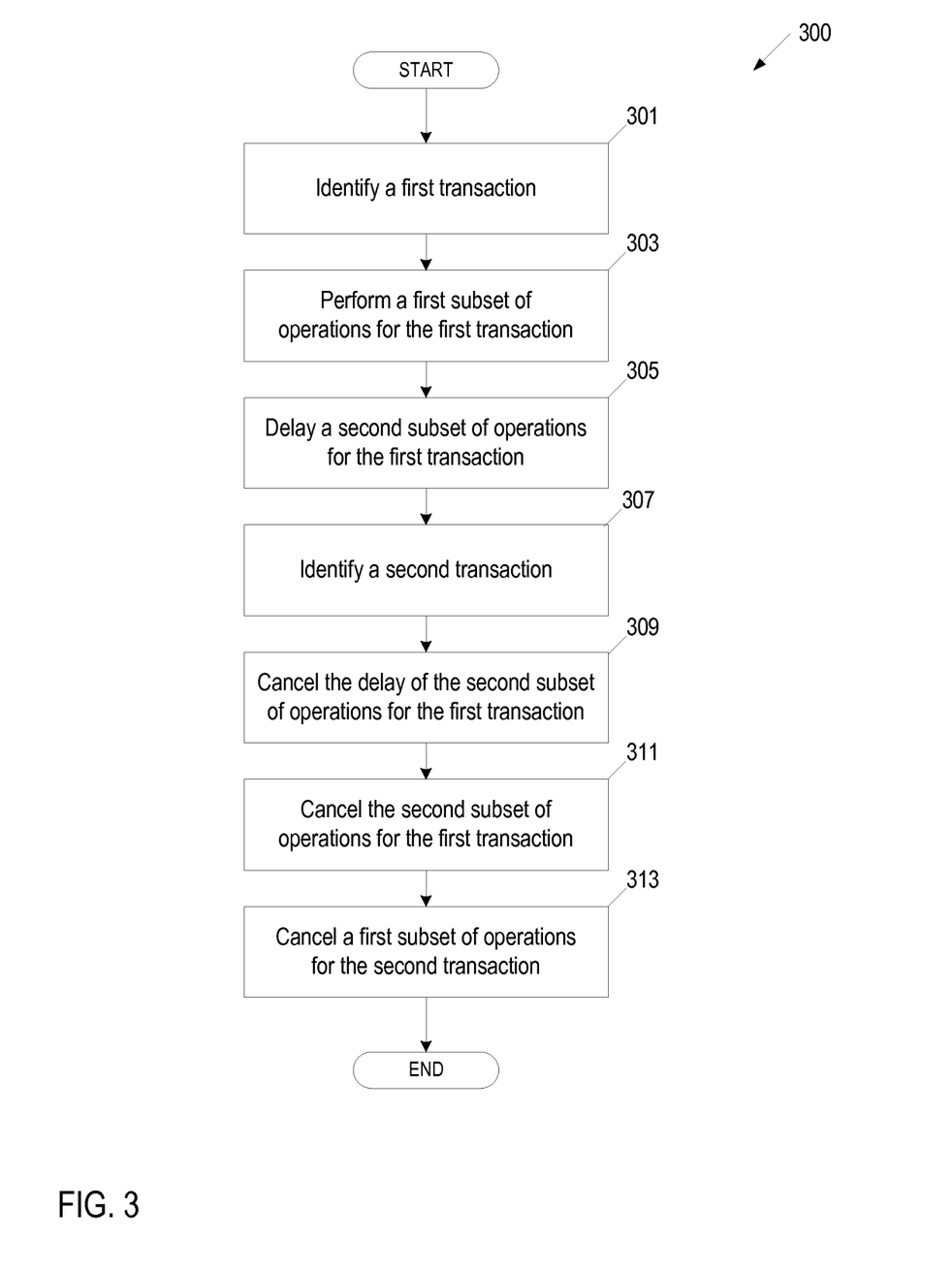
FIG. 3 is a flow diagram illustrating an implementation for a method for reducing transaction operations using deferred operations.

FIG. 3 is a flow diagram illustrating an implementation for a method for reducing transaction operations using deferred operations. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a storage server (e.g., storage server 143A-C) of FIG. 1.

At block 301, the server identifies a first transaction. The first transaction can be associated with a set of operations (e.g., lock operation, pre-operation change log operation, write operation, post-operation change log operation, unlock operation). At block 303, the server performs a first subset of operations for the first transaction. For example, the server may perform a lock operation, a pre-operation change log operation, and a write operation for the first transaction. At block 305, the server delays a second subset of operations for the first transaction. The second subset of operations can include one or more operations. For example, the server may delay performing the post-operation change log operation for the first transaction. At block 307, the server identifies a second transaction. The first transaction and the second transaction can be for the same file descriptor. One implementation covering a determination of whether the first transaction and the second transaction are for the same file descriptor is described in greater detail below in conjunction with FIG. 4.

At block 309, the server cancels the delay of the second subset of operations for the first transactions. At block 311, the server cancels the second subset of operations for the first transaction. The server can cancel the second subset of operations for the first transaction prior to performing the second set of operations for the first transaction. At block 313, the server cancels a first subset of operations for the second transaction. For example, the server may cancel a lock operation and/or a per-operation change log operation for the second transaction. In one implementation, the server determines which subset of operations to cancel for the second transaction based on mapping data that is stored in a data store that is coupled to the server. The mapping data can be configurable and/or user-defined. The mapping data can map operations that are being canceled for a first transaction to operations that should be canceled for a second transaction.

Figure 4:
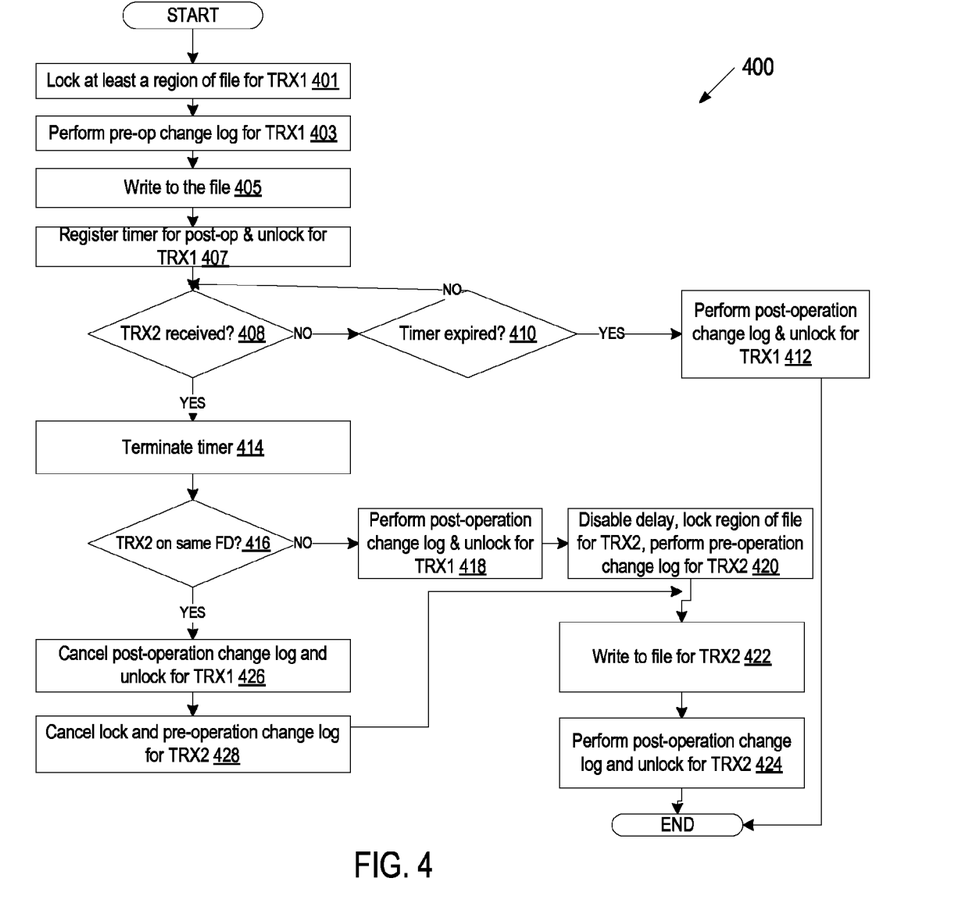
FIG. 4 is a flow diagram illustrating an implementation for a method for reducing transaction operations using deferred operations.

FIG. 4 is a flow diagram illustrating an implementation for a method for reducing transaction operations using deferred operations. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a storage server (e.g., storage server 143A-C) of FIG. 1.

At block 401, the server locks at least a region of the file for a first transaction (e.g., TX1) and performs a pre-operation change log operation for the first transaction at block 403. At block 405, the server writes to the file. At block 407, the server registers a timer for a post-operation change log operation and an unlock operation for the second transaction. At block 408, the server determines whether a second transaction (TX2) is received. If not, the server waits for the second transaction until the timer expires (block 410), and then performs a post-operation change log operation and an unlock operation for the first transaction at block 412.

If the second transaction is received, the server terminates the timer at block 414. In one example, the requests for the transactions (e.g., TX1, TX2) can be received from the same application (e.g., from the same guest operating system or the same guest application of a virtual machine). In another example, the requests for the transactions (e.g., TX1, TX2) can be received from the different applications. At block 416, the server can determine whether the second transaction is for the same file descriptor as the first transaction. A file descriptor is an index for an entry in a kernel-resident data structure containing the details of the open files. In POSIX (portable operating system interface), the data structure may be called a file descriptor table. The file descriptors can be assigned by the kernel, and the kernel can record the assignment in the file descriptor table. The server can determine whether the first transaction and the second transaction are for the same file descriptor from the file descriptor table.

If the second transaction is not for the same file descriptor as the first transaction, the server performs a post-operation change log operation and an unlock operation for the first transaction (block 418), and then disables the delay, locks a region of file for the second transaction, and performs a pre-operation change log operation for the second transaction (block 420). Disabling the delay of operations allows the unlock operation for TX1 to be performed more quickly and enables requests for the same data using a different file descriptor access to the file more readily. At block 422, the server writes to the file for the second transaction, and at block 424, the server performs a post-operation change log and an unlock operation for the second transaction.

If the second transaction is for the same file descriptor as the first transaction (block 416), the server cancels one or more operations (e.g., post-operation change log operation and/or unlock operation) for the first transaction at block 426. At block 428, the server cancels one or more operations (e.g., lock operation and/or pre-operation change log operation) for the second transaction. In one implementation, the server determines which subset of operations to cancel for the second transaction based on mapping data that is stored in a data store that is coupled to the server. The mapping data can map operations that are being canceled for a first transaction to operations that should be canceled for a second transaction. Next, the server writes to the file for the second transaction (block 422), and then performs a post-operation change log and an unlock operation for the second transaction (block 424).

Figure 5:
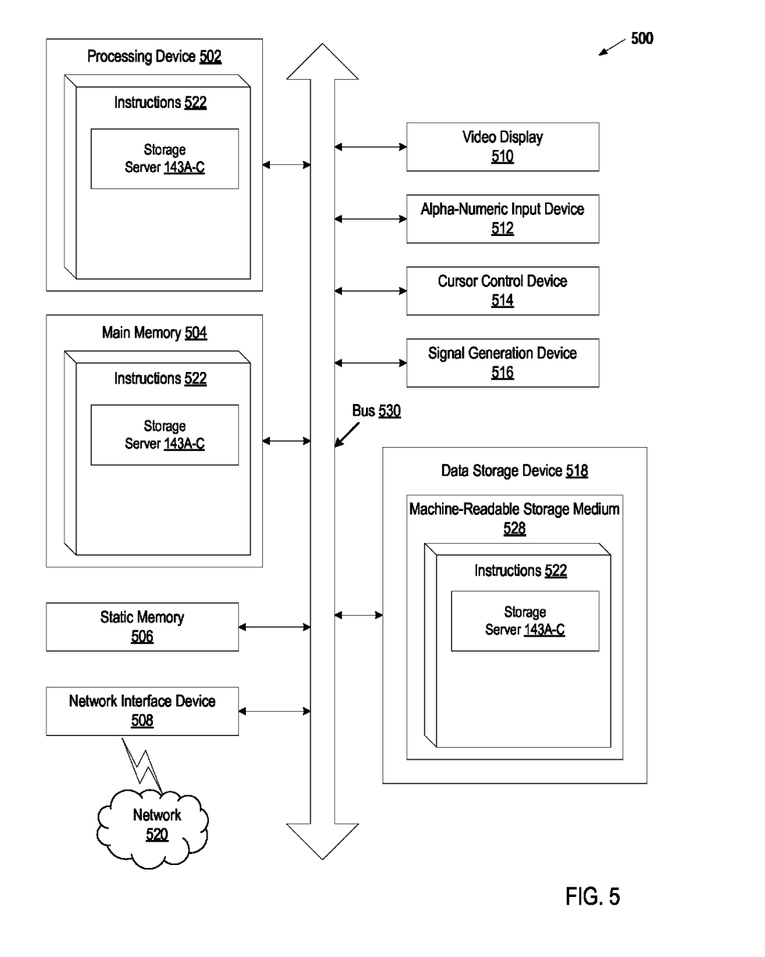
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a storage server (e.g., storage server 143A-C of FIG. 1), and/or a software library containing methods that call modules in a storage server. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "performing" or "delaying" or "canceling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   performing a first set of operations for a first transaction, the first transaction pertaining to file system operations performed on data stored in a file system, the first set of operations for the first transaction comprising a write operation and one or more pre-write operations for the first transaction with respect to the data;
   delaying, by a processing device of a server computer system, a second set of operations for the first transaction, the second set of operations for the first transaction comprising one or more post-write operations for the first transaction with respect to the data;
   identifying a second transaction pertaining to the data; and
   in response to identifying the second transaction, canceling the second set of operations for the first transaction, and canceling a first set of operations for the second transaction, the first set of operations for the second transaction comprising one or more pre-write operations for the second transaction with respect to the data.

2. The method of claim 1, wherein the first transaction and the second transaction correspond to a same file descriptor.

3. The method of claim 1, wherein the one or more post-write operations for the first transaction comprise:
   at least one of a post-operation change log operation or an unlock operation.

4. The method of claim 1, wherein the one or more pre-write operations for the second transaction comprise:
   at least one of a lock operation or a pre-operation change log operation.

5. The method of claim 1, wherein the first transaction and the second transaction overlap in time.

6. The method of claim 1, wherein canceling the second set of operations for the first transaction is performed prior to performing the second set of operations for the first transaction.

7. The method of claim 1, further comprising:
delaying a third set of operation for the first transaction;
canceling the third set of operations for the first transaction; and
canceling a second set of operations for the second transaction.

8. A non-transitory computer-readable storage medium including instructions that, when executed by a processing device, cause the processing device to perform operations comprising:
performing a first set of operations for a first transaction, the first transaction pertaining to file system operations performed on data stored in a file system, the first set of operations for the first transaction comprising a write operation and one or more pre-write operations for the first transaction with respect to the data;
delaying, by the processing device, a second set of operations for the first transaction, the second set of operations for the first transaction comprising one or more post-write operations for the first transaction with respect to the data;
identifying a second transaction pertaining to the data; and
in response to identifying the second transaction, canceling the second set of operations for the first transaction, and canceling a first set of operations for the second transaction, the first set of operations for the second transaction comprising one or more pre-write operations for the second transaction with respect to the data.

9. The non-transitory computer-readable storage medium of claim 8, wherein the first transaction and the second transaction correspond to a same file descriptor.

10. The non-transitory computer-readable storage medium of claim 8, wherein the one or more post-write operations for the first transaction comprise:
at least one of a post-operation change log operation or an unlock operation.

11. The non-transitory computer-readable storage medium of claim 8, wherein the one or more pre-write operations for the second transaction comprise:
at least one of a lock operation or a pre-operation change log operation.

12. The non-transitory computer-readable storage medium of claim 8, wherein the first transaction and the second transaction overlap in time.

13. The non-transitory computer-readable storage medium of claim 8, wherein canceling the second set of operations for the first transaction is performed prior to performing the second set of operations for the first transaction.

14. A system comprising:
a memory;
a processing device coupled to the memory to:
perform a first set of operations for a first transaction, the first transaction pertaining to file system operations performed on data stored in a file system, the first set of operations for the first transaction comprising a write operation and one or more pre-write operations for the first transaction with respect to the data;
delay a second set of operations for the first transaction, the second set of operations for the first transaction comprising one or more post-write operations for the first transaction with respect to the data;
identify a second transaction pertaining to the data; and
in response to identifying the second transaction, cancel the second set of operations for the first transaction, and cancel a first set of operations for the second transaction, the first set of operations for the second transaction comprising one or more pre-write operations for the second transaction with respect to the data.

15. The system of claim 14, wherein the first transaction and the second transaction correspond to a same file descriptor.

16. The system of claim 14, wherein the one or more post-write operations for the first transaction comprise:
at least one of a post-operation change log operation or an unlock operation.

17. The system of claim 14, wherein the one or more pre-write operations for the second transaction comprise:
at least one of a lock operation or a pre-operation change log operation.

18. The system of claim 14, wherein the first transaction and the second transaction overlap in time.

19. The system of claim 14, wherein the second set of operations for the first transaction is canceled prior to performing the second set of operations for the first transaction.

20. The system of claim 14, wherein the processing device is further to:
delay a third set of operation for the first transaction;
cancel the third set of operations for the first transaction; and
cancel a second set of operations for the second transaction.

* * * * *